United States Patent
Shoen

(10) Patent No.: US 8,027,053 B2
(45) Date of Patent: Sep. 27, 2011

(54) HOST-BASED PRINTER DRIVER

(75) Inventor: Jay Shoen, Boise, ID (US)

(73) Assignee: Marvell International Technology Ltd. (BM)

(*) Notice: Subject to any disclaimer, the term of this patent is extended or adjusted under 35 U.S.C. 154(b) by 91 days.

(21) Appl. No.: 12/421,347

(22) Filed: Apr. 9, 2009

(65) Prior Publication Data
US 2009/0195809 A1  Aug. 6, 2009

Related U.S. Application Data

(63) Continuation of application No. 10/840,696, filed on May 5, 2004, now Pat. No. 7,532,345.

(51) Int. Cl.
*G06F 3/12* (2006.01)
(52) U.S. Cl. .......... 358/1.15; 358/1.16; 358/1.9
(58) Field of Classification Search .......... None
See application file for complete search history.

(56) References Cited

U.S. PATENT DOCUMENTS

| | | | | |
|---|---|---|---|---|
| 5,594,860 | A * | 1/1997 | Gauthier | 345/543 |
| 5,768,489 | A * | 6/1998 | Adachi et al. | 358/1.18 |
| 6,512,595 | B1 * | 1/2003 | Toda | 358/1.9 |
| 6,883,981 | B2 * | 4/2005 | Kizaki et al. | 400/76 |
| 6,947,158 | B1 * | 9/2005 | Kitamura et al. | 358/1.15 |
| 6,954,283 | B2 * | 10/2005 | Yang et al. | 358/1.18 |
| 7,064,858 | B2 * | 6/2006 | Iwai et al. | 358/1.2 |
| 7,072,052 | B1 * | 7/2006 | Tanahashi et al. | 358/1.1 |
| 7,103,833 | B1 * | 9/2006 | Sano et al. | 715/206 |
| 7,313,699 | B2 * | 12/2007 | Koga | 713/170 |
| 7,333,222 | B2 * | 2/2008 | Someno et al. | 358/1.15 |
| 7,379,197 | B2 * | 5/2008 | Yang et al. | 358/1.13 |
| 7,483,166 | B2 * | 1/2009 | Kadoi et al. | 358/1.18 |
| 2002/0089682 | A1 * | 7/2002 | Yang et al. | 358/1.12 |
| 2004/0246502 | A1 * | 12/2004 | Jacobsen et al. | 358/1.1 |

* cited by examiner

*Primary Examiner* — King Poon
*Assistant Examiner* — Dung D Tran

(57) ABSTRACT

A system includes a controller operable to receive a first data set comprising data in a first format type, the first-format-type data representing an image. The system further includes a circuit coupled to the controller, the circuit operable to produce a second data set in a second format type, the second data set based on the first-format-type data, the second data set representing the image.

17 Claims, 2 Drawing Sheets

HOST-BASED PRINTER DRIVER

CROSS-REFERENCE TO RELATED APPLICATIONS

This application is a continuation of U.S. application Ser. No. 10/840,696, filed May 5, 2004, which is hereby incorporated by reference.

BACKGROUND

Host-based printer drivers are software applications that process print data (i.e., data to be sent to a printer) on a host device, such as a personal computer. By processing the print data on the host device, the printer driver allows the host device to cooperate with printers having minimal processing capability (and, thus, a lower cost) while yielding superior print quality.

However, because such low-capability printers cannot process object-oriented graphics (e.g., vector graphics and associated text fonts), the printer driver typically converts object-oriented images into raster (bitmap) data before the printer can print the images. Unfortunately, such data conversion often places high demands on the processing resources of the host device, and thus can detract from the performance of applications simultaneously running on the host device.

SUMMARY

According to an embodiment of the invention, a system includes a controller operable to receive a first data set comprising data in a first format type, the first-format-type data representing an image. The system further includes a circuit coupled to the controller, the circuit operable to produce a second data set in a second format type, the second data set based on the first-format-type data, the second data set representing the image.

DETAILED DESCRIPTION

Most modern personal computers (PCs) are equipped with video cards (aka video adapters) that have high-level 2D and 3D graphics processing capabilities. Conventionally, PCs employ such video card processing capability solely to process data to be rendered by a video display. According to an embodiment of the invention, a host-based printer driver leverages this video card capability to process print data.

Figure 1:
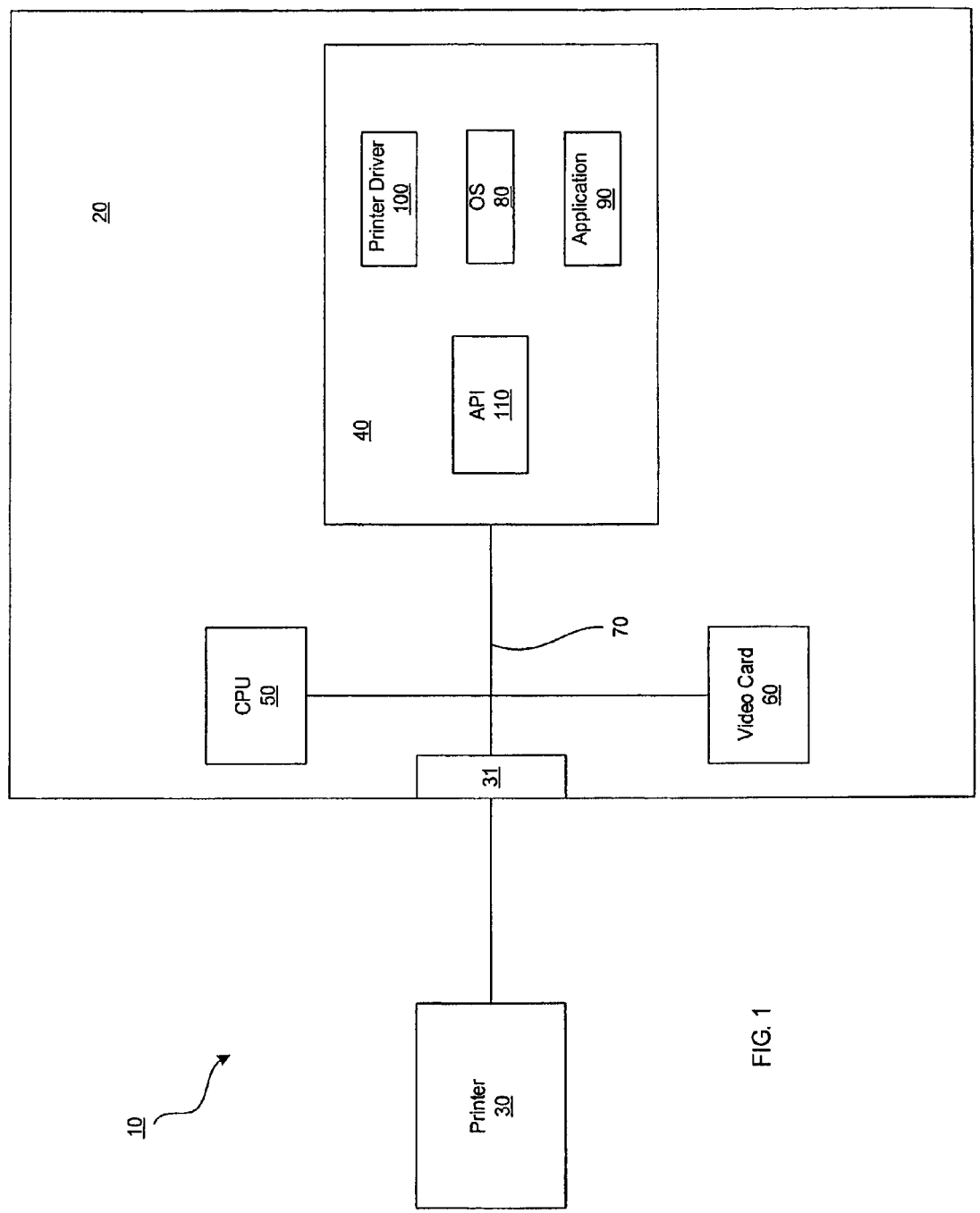
FIG. 1 is a logical block diagram of a system, according to an embodiment of the invention, for printing an image.

FIG. 1 illustrates a system 10, according to an embodiment of the invention, for printing an image. The system 10 includes a computer 20, such as a PC or workstation, coupled to a printer 30 through a printer interface 31. The computer 20 includes a memory 40 which is coupled to a computer processing unit (CPU) 50, a video card 60, and the interface 31 over a data bus 70. The memory 40 also stores an operating system (OS) 80, an application 90, a printer driver 100, and an application programming interface (API) 110. It is understood that the CPU 50 executes the OS 80, application 90, printer driver 100, and API 110 in a conventional manner.

In operation, the application 90 issues a print request, with associated print data representing an image (e.g., graphics or text), to the driver 100 through defined interfaces associated with the OS 80. The print data received by the driver 100 can be in a variety of known application-specific formats, such as, for example, bitmapped graphics, bitmapped text fonts, vector-graphics text fonts and/or vector graphics. The driver 100 converts any non-raster print data to raster data so that the printer 30 can print the associated image.

The driver 100 translates the vector-graphics-based print data into a set of executable commands. The driver 100 communicates these commands to the video card 60 for execution. In one embodiment, the driver 100 is configured to employ a high-level cross platform API 110, such as OpenGL® or DirectX, in order to communicate with the video card 60. Of course, the driver 100 can be configured to utilize other custom APIs as well.

In executing the commands received from the driver 100, the video card 60 produces bitmapped images of points, arcs, lines, text and other shapes corresponding to the vector graphics, and thus to the associated image. The commands may further instruct the video card 60 to fill, as appropriate, the rendered bitmapped shapes in a manner and with colors specified by the commands. For example, at the direction of the driver 100, the video card 60 may render overlapping objects, only a topmost object, or blended objects in the case of semi-transparent objects.

In a case where the print data includes both vector graphics and bitmap data, the driver 100 may pass the bitmap data, along with the commands, to the video card 60. The video card 60 may cache this bitmap data in a memory (not shown) of the video card 60, and later place the bitmap data in an appropriate location of the image rendered by the video card 60.

Once the video card 60 has rendered into bitmap format the image (or portion thereof) associated with the print data, the video card 60 communicates the bitmapped image to the memory 40. The driver 100 may then employ the CPU 50 to perform any necessary post processing of the rendered image before providing the image to the printer 30, via the interface 31, for printing.

As discussed above, video cards are conventionally used to process data for display on video monitors. Standard video monitors are capable of displaying far fewer pixels than can be displayed on a printed page. If a particular print-data set represents an image that, when in bitmap format, requires a large number of pixels, the video card 60 may not be able to render the entire image.

Figure 2:
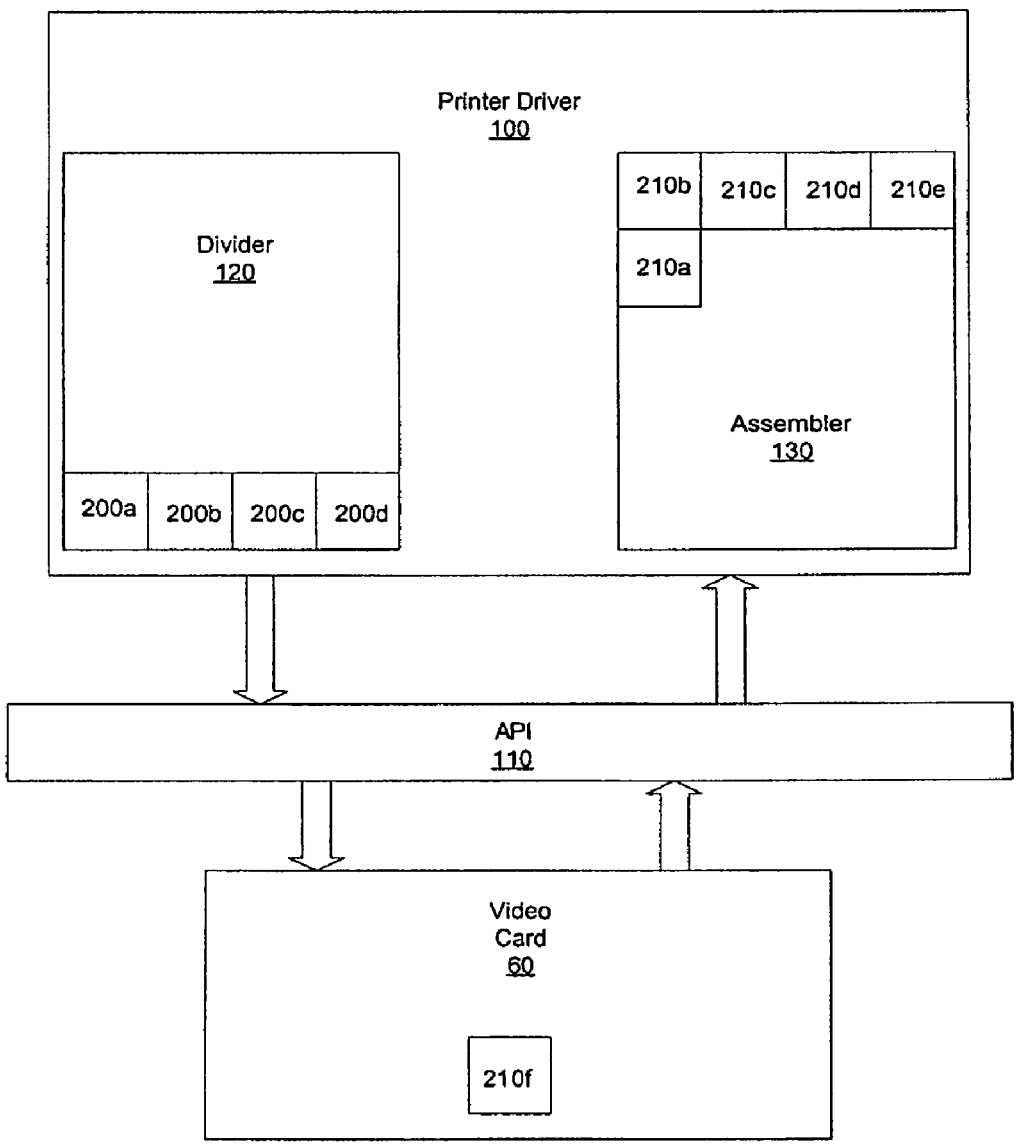
FIG. 2 is a logical block diagram illustrating interaction among components of the system of FIG. 1 according to an embodiment of the invention.

As illustrated in FIG. 2, an embodiment of the driver 100 includes a divider 120 and an assembler 130. The assembler 120 is operable to divide into portions 200 (only portions 200a-200d shown) a print-data set received from the application 90. The driver 100 translates each vector-graphic portion 200 into a corresponding instruction set and serially issues each instruction set to the video card 60 for execution. Each instruction set, once executed by the video card 60, produces a corresponding bitmap portion 210 that the video card 60 subsequently provides to the assembler 130. The assembler 130 is operable to assemble the bitmap portions 210 into the complete bitmapped version of the image. The driver 100 then provides the assembled bitmapped image to the printer 30.

In an alternative embodiment, the driver 100 may allocate a subset of the data portions 200 to the video card 60 for processing. The driver 100 itself may then process the data portions 200 not allocated to the video card 60 to produce corresponding bitmap portions 210. The processing by the driver 100 of data portions 200 may or may not be simultaneous with processing by the video card 60 of data portions 200.

The preceding discussion is presented to enable a person skilled in the art to make and use the invention. Various modifications to the disclosed embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A system comprising:
   memory storage including an operating system;
   a printer driver in the memory storage and executable by a processor, wherein the printer driver is operable to
      receive a print request, with associated print data representing an image, through an interface of the operating system;
      divide the print data into at least first and second print data portions;
      render the first data portion of the print data to a first bitmap stored in the memory storage;
      communicate commands through an application programming interface to a video card, wherein the commands direct the video card to render the second print data portion to a second bitmap for storage in the memory storage, wherein the memory storage differs from a video memory concurrently used by the video card to display video to a screen; and
      assemble at least the first and second bitmaps for provision to a printer.

2. The system of claim 1, wherein the print data comprises vector graphics.

3. The system of claim 1, wherein the print data comprises bitmap graphics.

4. The system of claim 1, wherein the second print data portion comprises vector graphics and the commands communicated through the application programming interface to the video card comprise vector graphic processing commands.

5. The system of claim 1, wherein the first print data portion comprises bitmap graphics and the commands communicated through the application programming interface to the video card comprise bitmap graphic processing commands.

6. The system of claim 1, wherein the printer driver is further operable to direct post-processing of bitmap data before provision to the printer.

7. A system comprising:
   a host processor;
   a video card adapted to render video data for provision to a display; and
   memory storage including an operating system and a printer driver executable by the host processor;
   wherein the printer driver is operable to communicate with the video card through an application programming interface;
   wherein the printer driver is further operable to divide the print data into first and second print data portions for rendering using the host processor and video card, respectively,
   wherein the printer driver is further operable to direct the video card to render at least a portion of print data representing an image as bitmap data for provision to a printer.

8. The system of claim 7, wherein the host processor renders the first data portion of the print data to a first bitmap stored in the memory storage, and the video card renders the second data portion of the print data to a second bitmap stored in the memory storage.

9. The system of claim 8, wherein the printer driver is operable to assemble at least the first and second bitmaps for provision to the printer.

10. The system of claim 8, wherein the print data comprises vector graphics.

11. The system of claim 8, wherein the print data comprises bitmap graphics.

12. The system of claim 7, wherein the second print data portion comprises vector graphics.

13. A method for processing an image for provision to a printer, comprising:
    receiving a print request, with associated print data representing an image, through an interface of an operating system;
    dividing the print data into at least first and second print data portions;
    rendering the first data portion of the print data to a first bitmap stored at a first location in memory storage using a printer driver;
    communicating commands from the printer driver, through an application programming interface, to a video card for directing the video card to render the second print data portion to a second bitmap;
    storing the second bitmap at a second location in memory storage; and
    assembling at least the first and second bitmaps for provision to a printer.

14. The method of claim 13, further comprising post-processing the assembled first and second bitmaps before provision to the printer.

15. A method for rendering an image for provision to a printer, comprising:
    communicating with a video card through an application programming interface to provide print data representing an image;
    dividing the print data into first and second print data portions; and
    directing the video card, through the application programming interface, to render at least the first print data portion as bitmap data for provision to a printer, wherein the video card provides video data to a display while rendering the print data, wherein the second print data portion is rendered by a host processor external to the video card.

16. The method of claim 15, further comprising post-processing the bitmap data before provision to the printer.

17. The method of claim 15, further comprising:
    storing the bitmap data in a memory storage, wherein the memory storage differs from a video memory storage concurrently used by the video card to display video to the display.

* * * * *